Feb. 17, 1953 T. M. GLUYAS, JR., ET AL 2,629,013
TUNED CIRCUIT
Filed May 12, 1949
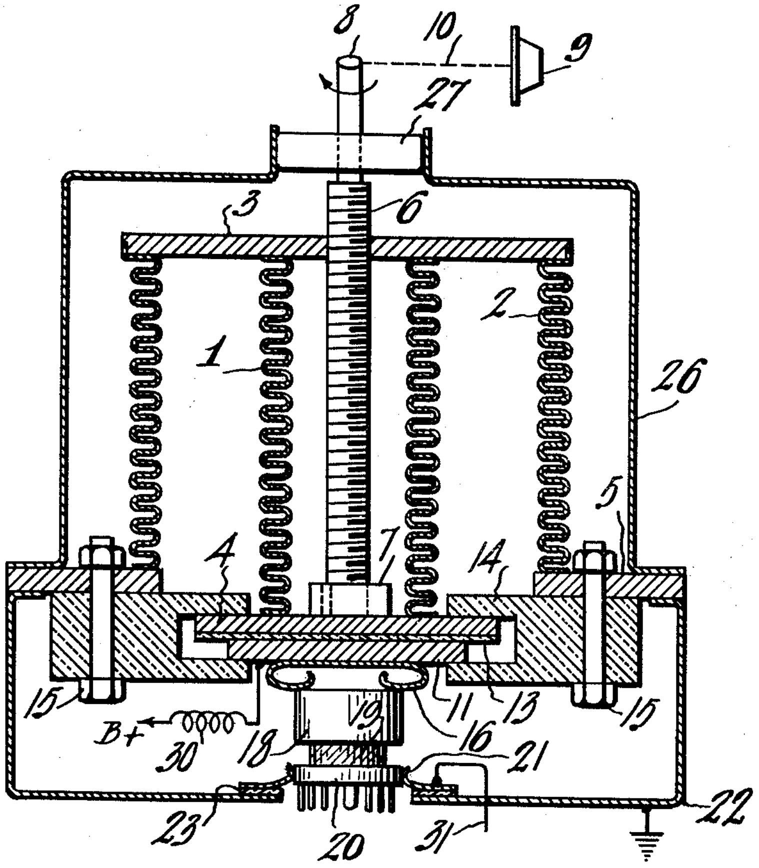
INVENTORS
Thomas M. Gluyas, Jr.
& Frederick H. Schneider
BY [signature]
ATTORNEY Patented Feb. 17, 1953

2,629,013

UNITED STATES PATENT OFFICE 2,629,013

TUNED CIRCUIT

Thomas M. Gluyas, Jr., Collingswood, and Frederick Henry Schneider, Westville, N. J., assignors to Radio Corporation of America, a corporation of Delaware Application May 12, 1949, Serial No. 92,754

6 Claims. (Cl. 178—44)

This invention relates to a tunable electrical circuit, and particularly to a coaxial line type of variable inductance arrangement for use in a tuned circuit.

In a wide band amplifier, such as in a television system, the greatest band width is obtained when the capacity is a minimum. It is desirable that the tuned circuit add a minimum of capacitance to the unavoidable vacuum tube interelectrode capacities. It is also desirable that this tuned circuit should have a relatively wide range of adjustment.

The foregoing desirable characteristics are achieved by the present invention which has for some of its objects: 1. to provide a variable inductance for use in a tuned circuit which; (*a*) has low distributed capacity compared to lumped tuned circuits; (*b*) eliminates the need for moving or sliding contacts; and (*c*) has a relatively wide tuning range; 2. to provide a variable inductance for use in a television power amplifier circuit suitable for operation in a frequency band centered on a mean frequency anywhere in the range of 100 to several hundred megacycles, by means of which it is possible to maintain the circuit capacity at a minimum and obtain tuning over a wide frequency range of the order of 1⅓ to 1 in frequency.

Briefly stated, the present invention comprises a coaxial line type of variable inductance in which the inner and outer conductors of the coaxial line are made in the form of axially substantially coextensive electrically conducting bellows simultaneously variable in length in response to a tuning adjustment. This coaxial line type of variable inductance is resonated by the vacuum tube interelectrode capacities to constitute therewith a tuned circuit.

A more detailed description of the invention follows, in conjunction with a drawing whose single figure illustrates the novel mechanical and electrical features of the invention.

Referring to the drawing in more detail, the variable inductor arrangement of the invention comprises a section of coaxial line having an inner conductor 1 and an outer conductor 2, both in the form of metallic bellows. One end of each of the conductors 1 and 2 is mechanically and electrically connected to a flat metallic plate 3. The opposite end of the inner conductor 1 is mechanically and electrically connected to a metallic plate 4, while the other end of conductor 2 is mechanically and electrically connected to an annular metal plate 5 having a large central opening therein. The inner and outer conductors 1 and 2, and the plates 3 and 4 are circular in shape. Mounted within the inner conductor 1 along the same axis, there is provided an adjustable screw 6, one end of which is keyed in a bearing 7 and having a part thereof threadedly engaging the metallic plate 3 through a central threaded opening in this plate. Screw 6 is provided with a shaft 8 which is rotatable in a bearing 27. The purpose of the adjustable screw is to simultaneously vary in length the inner and outer conductors 1 and 2 of the coaxial line type of resonator in response to rotation of the tuning shaft 8 which is integral with the upper end of the screw. Rotation of the screw 6 to adjust the length of the variable inductance may be accomplished in any suitable manner. One way in which this may be done is by means of a rotatable dial 9 suitably linked, as by gears, to the tuning shaft 8. This gear link is indicated by the dash line 10.

Metallic plate 4 is positioned above a smaller metallic plate 11, but physically spaced therefrom by a mica spacer 13 in such manner that the two plates 4, 11 and the mica spacer 13 sandwiched therebetween constitute a capacitor.

Plates 4 and 11 are rigidly secured to each other by means of an annular block of insulation 14. This block of insulation 14 also serves to rigidly mount the annular metallic plate 5 by means of a plurality of nut and bolt arrangements 15. If desired, where mechanical considerations so dictate, the block 14 can be divided into several segments.

Fastened to the bottom of metallic plate 11 there is provided a U-shaped metallic spring-clip arrangement 16 which serves to electrically connect the anode 18 of a power amplifier tube to the plate 11.

For use with the coaxial line resonator of the invention, there is shown a vacuum tube having a glass envelope 19 at one end of which is the anode block 18 and on the other end of which there is shown a screen grid ring 20. At the bottom of the vacuum tube there are shown several prongs for connecting the various electrodes of the vacuum tube to external circuits. Connection to the screen grid is made by means of a plurality of annularly arranged spring contacts 21 which are mounted upon a metallic shelf 22, although spaced from this metallic shelf by mica 23. The extension of the spring contacts 21, the mica spacer 23 and the shelf 22 constitute a capacitor for radio frequency currents. Shelf 22 forms part of a grounded box and is shown fastened to metallic plate 5. The radio frequency currents between the vacuum tube electrode terminals 18, 20 flow along an enclosed path which includes the contacts 16; the anode blocking capacitor 11, 13, 4; the adjustable coaxial circuit 1, 3, 2; the annular plate 5, the grounded box 22; and the screen grid by-pass capacitor 23, 21.

A yoke support 26 fastened at one end to metallic plate 5 serves to support the ball bearing 27 through which the tuning shaft 8 passes.

For supplying positive potential to the anode 18 of the vacuum tube there is provided a radio frequency choke coil 30, one end of which is connected to the metallic plate 11 while the other end extends to a source of high potential labeled B+ For supplying a suitable positive potential to the screen grid 20, a lead 31 is shown connected to the spring contacts 21. This lead 31 connects to a suitable external circuit, not shown. In the construction illustrated, the variable coaxial line resonator 1, 2 resonates with the interelectrode capacities of the vacuum tube 18, 19, 20 to form a tuned circuit having no moving or sliding contacts and tunable over a relatively wide tuning range.

In one embodiment of the invention actually tried out in practice with very satisfactory results, the outer conductor of the coaxial line resonator was about four inches in diameter, the inner conductor 1 was about two and three quarter inches in diameter, while the length of the resonator 1, 2 was made to vary from a maximum of about four inches to a minimum of about two inches in response to movement of the adjusting screw 6. The vacuum tube used in association with this coaxial line resonator was a wide band radio frequency amplifier in a television transmitter circuit. The tuning range of the resonator 1, 2 covered the frequency band of 174 to 216 megacycles and also a frequency range extending outside of and both sides of this tuning range, with an overall tuning range of approximately 1⅓ to 1 in frequency. The vacuum tube used was the tetrode type 4X-150A. Actually four of these vacuum tubes were employed in parallel to provide a great power output than obtainable by a single vacuum tube.

It should be noted from an inspection of the drawing that the metallic plates 4 and 11 are different in size, and that the mica 13 extends over the entire lower surface of the plate 4. This construction provides a large leakage path and serves to prevent flash-over due to the large anode potentials employed in the circuit arrangement.

Although the variable coaxial line type resonator of the invention has been described above for use in association with the output of a power amplifier, it should be understood that this variable inductance can be employed in any type of tuned circuit (either in the input or the output of a vacuum tube arrangement) irrespective of whether the vacuum tube is employed as an amplifier or an oscillator.

We claim:

1. A variable inductor comprising a section of coaxial transmission line adapted to carry high frequency currents, said line having inner and outer conductors in the form of axially substantially coextensive electrically conducting bellows, rigid metallic means bridging said bellows at one end of said section of line, a pair of separated inner and outer metallic plates arranged transversely to said conductors and respectively joined to the bellows at the other end of said section of line, a rotatable adjusting screw axially positioned within the inner conductor and threadedly engaging said rigid means, one end of said screw being positioned in a bearing secured to the inner one of said pair of plates, the other end of said screw constituting a shaft, a bearing for said shaft, and a yoke supporting said last bearing and mounted outside of said coaxial line and on the outer one of said pair of plates.

2. A variable inductor comprising a section of coaxial transmission line adapted to carry high frequency currents, said line having inner and outer conductors in the form of axially substantially coextensive electrically conducting bellows, rigid metallic means bridging said bellows at one end of said section of line, a pair of separated inner and outer metallic plates arranged transversely of said conductors and respectively joined to the bellows at the other end of said section of line, a rotatable adjusting screw axially positioned within the inner conductor and threadedly engaging said rigid means, one end of said screw being positioned in a bearing secured to the inner one of said pair of plates, the other end of said screw constituting a shaft, a bearing for said shaft, and a yoke supporting said last bearing and mounted outside of said coaxial line and on the outer one of said coaxially positioned plates, another transverse metallic plate secured to the inner one of said pair of plates but spaced therefrom by a dielectric to constitute therewith a capacitor, and spring clips fastened to said other metallic plate for engaging an electrode of an electron discharge device.

3. A variable reactor comprising a section of coaxial transmission line adapted to carry high frequency currents, said line having inner and outer conductors in the form of axially substantially coextensive-electrically conducting bellows, rigid metallic means bridging said bellows at one end of said section of line, a pair of separated inner and outer stationary metallic plates arranged transversely to said conductor and respectively joined to the bellows at the other end of said section of line, a rotatable adjusting screw axially positioned within the inner conductor and threadedly engaging said rigid means, one end of said screw being journaled and keyed in a bearing secured to the inner one of said pair of plates, the other end of said screw constituting a shaft for adjusting said screw.

4. A variable reactor comprising a section of coaxial transmission line adapted to carry high frequency currents, said line having inner and outer conductors in the form of axially substantially coextensive-electrically conducting bellows, rigid metallic means bridging said bellows at one end of said section of line, a pair of separated inner and outer stationary metallic plates arranged transversely of said conductors and respectively joined to the bellows at the other end of said section of line, an elongated rigid member axially positioned within the inner conductor and adjustably engaging said rigid means, one end of said rigid member being secured to the inner one of said pair of plates with respect to axial movement, another transverse metallic plate secured to the inner one of said pair of plates but spaced therefrom by dielectric material to constitute therewith a capacitor, and a resilient member fastened to said other metallic plate for engaging an electrode of an electron discharge device.

5. A variable inductor comprising a section of coaxial transmission line adapted to carry high frequency currents, said line having inner and outer conductors in the form of axially substantially coextensive-electrically conducting bellows, rigid metallic means bridging said bellows at one end of said section of line, a pair of separated inner and outer stationary metallic plates arranged transversely of said conductors and respectively joined to the bellows at the other end of said section of line, a rotatable adjusting screw axially positioned within the inner conductor and threadedly engaging said rigid means, one end of said screw being journaled in a bearing secured to the inner one of said pair of plates, the other end of said screw constituting a shaft for adjusting said screw, another transverse metallic plate secured to the inner one of said pair of plates but spaced therefrom by dielectric material to constitute therewith a capacitor, and a resilient member fastened to said other metallic plate for engaging an electrode of an electron discharge device.

6. A radio frequency tube mounting and shielding structure incorporating a variable inductor comprising an annular metallic member, a shield member arranged on one side of said annular metallic member to form a partially closed shielding assembly, there being an aperture in said shield member in registry with that of said annular metallic member for accommodating an electron discharge device of the type having a ring contact for a grid electrode, a section of coaxial transmission line adapted to carry high frequency currents, said line having inner and outer conductors in the form of axially substantially coextensive-electrically conducting bellows, rigid metallic means bridging said bellows at one end of said section of line, the other end of the outer conducting bellows being joined to said annular member and completing closure of said shielding assembly, a metallic disc concentrically located in fixed relationship with respect to said annular member and joined to the inner conducting bellows at the other end of said section of line, a rotatable adjusting screw axially positioned within the inner conductor and threadedly engaging said rigid means, one end of said screw being positioned in a bearing secured to said metallic disc, the other end of said screw constituting a shaft for rotating said screw, another metallic disc secured to the first said disc but spaced therefrom by a dielectric disc to constitute therewith a capacitor, spring clips fastened to said shield member at said aperture for engaging said ring, contact for the grid electrode, and spring clips fastened to said other metallic plate for engaging another electrode of said electron discharge device.

THOMAS M. GLUYAS, Jr.
FREDERICK HENRY SCHNEIDER.

REFERENCES CITED

The following references are of record in the file of this patent:

UNITED STATES PATENTS

| Number | Name | Date |
|---|---|---|
| 2,103,515 | Conklin ------------ | Dec. 28, 1937 |
| 2,142,630 | Conklin ------------- | Jan. 3, 1939 |
| 2,159,782 | Conklin et al. ------ | May 23, 1939 |
| 2,169,305 | Tunick ------------ | Aug. 15, 1939 |